March 6, 1973 L. H. FINK 3,719,809

COMPUTER CONTROLLED COORDINATION OF REGULATION AND ECONOMIC DISPATCH IN POWER SYSTEMS

Filed July 19, 1971

6 Sheets-Sheet 1

INVENTOR.
Lester H. Fink

BY

Paul & Paul

ATTORNEYS.

INVENTOR.
Lester H. Fink
BY
Paul + Paul
ATTORNEYS.

March 6, 1973 L. H. FINK 3,719,809

COMPUTER CONTROLLED COORDINATION OF REGULATION AND ECONOMIC DISPATCH IN POWER SYSTEMS

Filed July 19, 1971 6 Sheets-Sheet 3

INVENTOR.
Lester H. Fink

BY Paul & Paul

ATTORNEYS.

March 6, 1973 L. H. FINK 3,719,809

COMPUTER CONTROLLED COORDINATION OF REGULATION AND ECONOMIC DISPATCH IN POWER SYSTEMS

Filed July 19, 1971 6 Sheets-Sheet 4

INVENTOR.
Lester H. Fink

BY

Paul & Paul

ATTORNEYS.

INVENTOR.
Lester H. Fink
BY Paul + Paul
ATTORNEYS.

INVENTOR.
Lester H. Fink
BY
Paul & Paul
ATTORNEYS.

3,719,809
COMPUTER CONTROLLED COORDINATION OF REGULATION AND ECONOMIC DISPATCH IN POWER SYSTEMS

Lester H. Fink, R.F.D. 1, Doylestown, Pa. 18901

Continuation-in-part of abandoned application Ser. No. 6,127, Jan. 27, 1970. This application July 19, 1971, Ser. No. 163,894
Int. Cl. G06f *15/06, 15/56*
U.S. Cl. 235—151.21 24 Claims

ABSTRACT OF THE DISCLOSURE

Computer control of regulation and economic dispatch in a power network is achieved with separation of the dispatch and regulating functions. An independent economic dispatch signal is calculated from a summation of an error signal, representing the difference between system load and system generation, and a total generation signal derived from telemetered actual generation signals. The summation signal is processed to derive the economic dispatch signal which is used to control economic generation units providing the system fixed loading. An independent regulating signal is calculated from the error signal for control of the regulating units which provide the system transient loading.

CROSS REFERENCES TO RELATED APPLICATIONS

This application is a continuation-in-part of the copending application of the same inventor having Ser. No. 6,127, filed Jan. 27, 1970.

BACKGROUND OF THE INVENTION

(A) Field of the invention

This invention lies in the field of computer controlled power systems and more particularly in the field of computer controlled power systems for allocating power generation to fixed load units and regulating units.

(B) Description of the prior art

Electric power generating systems generally are comprised of a plurality of generating units of differing efficiencies and having differing absolute and incremental costs of power generated. A control area is a generating system network forming a portion of a larger system, which maintains the net flow of power across it boundaries at or near a scheduled value that is usually revised hourly. An interconnection, as used herein, is a group of discrete systems, interconnected for economic operation. Depending upon the contractual relationship, an interconnection may comprise a number of constituent control areas, or alternatively, it may comprise a single control area. Within a control area, generating units are regulated by a load dispatch system so as to match system generation with system load on an economic basis.

For effective control of an interconnected power system it is essential that the loading of limited capacity tie lines connecting large power systems be maintained within safe limits. This is effected by requiring each of the interconnected systems to maintain the mismatch between their own load, properly defined, and their own generation within corresponding appropriate limits. In turn, this is accomplished by assigning blocks of generating capacity on one or more generating sources to follow rapid load changes. Remaining generating capacity is loaded in the most economical manner in order to minimize the cost of power. Allocation of this economic generation or economic fixed loading increasingly is being accomplished by a computer-calculated economic dispatch signal which, for practical purposes, should represent steady state or static optimization and ignore the effect of transients, while regulation is provided by controlling the regulating units in response to a signal which represents the mismatch between generation and load. If these functions are not kept separate, deficiencies in the response of the regulating units will be compensated to a certain extent by response from the non-regulating units, with an accompanying adverse effect on economy. Present automatic control systems in operation exemplify such lack of separation between control and economic dispatch functions.

An example of the present art approach to system control embodies continuous monitoring of frequency and tie-line power flow, and comparison thereof with scheduled frequency and scheduled tie-line flow, the respective differences being combined to produce an error signal, called the "area control error" (ACE) signal, representing the difference between load and generation. In many control areas, the ACE signal is used to activate proportional controllers for controlling the regulating units, and through proportional and reset (integrating) controllers to generate an overall economic incremental cost signal for allocating fixed loading. However, since the ACE signal is not a derivative of the system load, its integration does not provide a true or even adequate representation of the load. The result is a control of the "economic" units in an inefficient manner which often results in a substantial loss in economy.

A more satisfactory and reliable system operation can be achieved by providing more on-line information than is presently provided in the ACE signal. The concept of successful steady state optimization through economic dispatch requires a reliable measure of actual system load as an input to the computer which calculates the economic dispatch control signal. The system must also contain sufficient dynamic regulating capacity to handle the transient loads. However, because input signals to a digital computer can only be sampled periodically, it is necessary to filter the signal before it is sampled in order to avoid erroneous interpretation of the signal by the computer. Actual control of the system must take into account the effect of transients on system costs, limitations on the rate of change of generation of individual units, and consideration affecting system stability when driving toward an optimal state in which cost of operation is minimized.

SUMMARY OF THE INVENTION

It is an object of my invention to provide an improved control for power generation control areas in which interdependence between the economic dispatch and regulating functions is eliminated.

It is a further object of my invention to provide an improved control of the regulating units, through generation of a regulating function having both proportional and reset control.

It is a further object of my invention to provide for the control of power generation within interconnected electric systems which will result in appreciable economies due to the most economic dispatch of power.

It is a further object of the present invention to provide a system for automatically controlling the generation or output of a plurality of generators and generating stations that is capable of distributing the generating load for maximum economy, holding tie-line power interchange to scheduled values and, simultaneously, holding the system frequency to the predetermined value.

Another object of this invention is to provide a control system wherein the operation of the economic generating units is unaffected by relatively high frequency changes in generation of the regulating units.

Another object of this invention is to provide a control system having proper filtering to insure stable system performance.

Accordingly, in the system of this invention actual generation signals are telemetered to a central computer and added to the conventionally calculated ACE signal to obtain a true signal of the total system load, which in turn is utilized in the computation of an economic incremental cost signal for allocation of fixed loading, which signal is transmitted to and controls the economic units of the system. The ACE signal is also utilized to calculate a control signal which is transmitted to and controls the regulating units. Digital filtering of the ACE signal to eliminate from the frequency spectrum of the signal all frequency components above one-half the control sampling frequency, and of the total system load signal to remove all frequencies beyond those which can be followed efficiently and economically, ensures the accuracy and stability of the control signal.

DESCRIPTION OF THE PREFERRED EMBODIMENT

Figure 1:
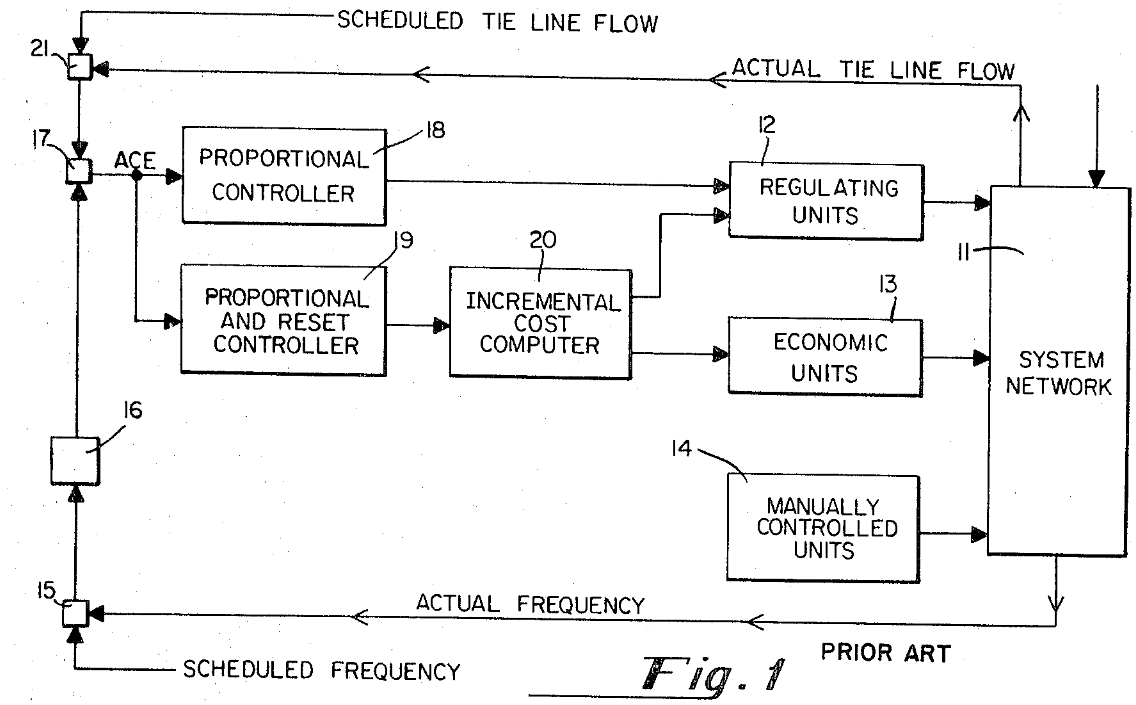
FIG. 1 is a block diagram of a prior art system for coordination of regulation and economic dispatch in automatic power system control.

Referring now to FIG. 1, there is shown a conventional control system for coordination of regulation and economic dispatch in a power utility. System network 11 represents a control area, typically a single power company, but optionally several separate power companies which are tied together and under overall control. The system generation which directly supplies the system network 11, or system load, is provided by specific regulating units 12 which are responsive to the dynamic load and economic units 13 which operate on an economic basis to provide for the more slowly varying component of the load. It is understood that both units 12 and 13 are conventional commercially available generating units, which are susceptible of control by application of proper electrical control signals. The regulating units and the economic units may be the same type of generator, the difference being the function assigned to each. Of course, the most efficiently operating generators are assigned the role of providing the steady loads, so that a maximum amount of power is generated at the cheapest available cost. For a further discussion of this aspect of the dispatch function, see "Techniques in Handling Load Regulation Problems on Inter-Connected Power Systems," by C. Nichols, published in the AIEE Transactions, 1953, vol. 72, pp. 447–460. See particularly FIG. 10, page 455. The author uses the term "sustained response station" synonymously with "economic unit" and "fringe response station" synonymously with "regulating unit." In addition, manually controlled units 14 may be provided for additional system capacity.

In present power utility control systems, such as shown in FIG. 1, frequency and tie-line power flow are continuously monitored and compared with scheduled frequency and tie-line flow, the respective differences being combined algebraically to produce an error signal, called the "area control error" or ACE signal, which represents the difference between generation and load and provides the basic control signal. It is well known that on an isolated power system any mismatch between system load and generation results in a deviation of system frequency from its scheduled value. As long as this mismatch is not too great, such change in system frequency is related linearly to such mismatch, so that the deviation, when multiplied by an appropriate coefficient, provides a direct measure of the mismatch. Thus, as shown in FIG. 1, signals representing actual frequency and scheduled frequency may be compared by a conventional comparator 15, which comparator signal may be converted into an electrical signal representing load deviation for the isolated system by multiplication by a coefficient K. Unit 16 in FIG. 1 could represent any conventional circuit, such as a linear voltage divider or amplifier, which provides an output different from the input by a coefficient K.

On a power system which is not isolated but which is connected to neighboring systems and is interchanging a scheduled amount of energy with them, the scheduled interchange of energy, or scheduled tie-line flow, can be taken as a component of the system's load, such that any deviation of actual tie-line flow from scheduled tie-line flow can be combined algebraically with the load deviation obtained through frequency comparison to give a combined control error function. Note that in FIG. 1 the signal represented as actual tie-line flow represents the net tie-line flow into or out of the system. Comparator 21 gives a tie-line flow deviation signal. While the system is not isolated when connected to a neighboring system, and there is thus theoretically some interdependence between frequency deviation and tie-line flow deviation, the algebraic combination of these two signals is a reasonable first order approximation which provides a serviceable control error function. For a discussion on modes of control and optimal control theory, see "The Megawatt-Frequency Control Problem—A New Approach Via Optimal Control Theory," by Charles E. Fosha, Jr. and O. I. Elgerd, IEEE Transactions, Power Apparatus & Systems, April 1970, volume PAS–89, No. 4, pages 556–577.

Still referring to FIG. 1, the ACE signal is obtained by conventional adder 17. Closing the loop using the ACE signal, as shown in FIG. 1, results in a closed loop control system. Often, the ACE signal is supplied to activate proportional controllers 18 for controlling the regulating generators 12, and is coupled to proportional and reset, or integrating controllers 19 to generate an overall cost signal which controls the economic units. The cost signal may be generated by a cost computer 20.

Figure 3:
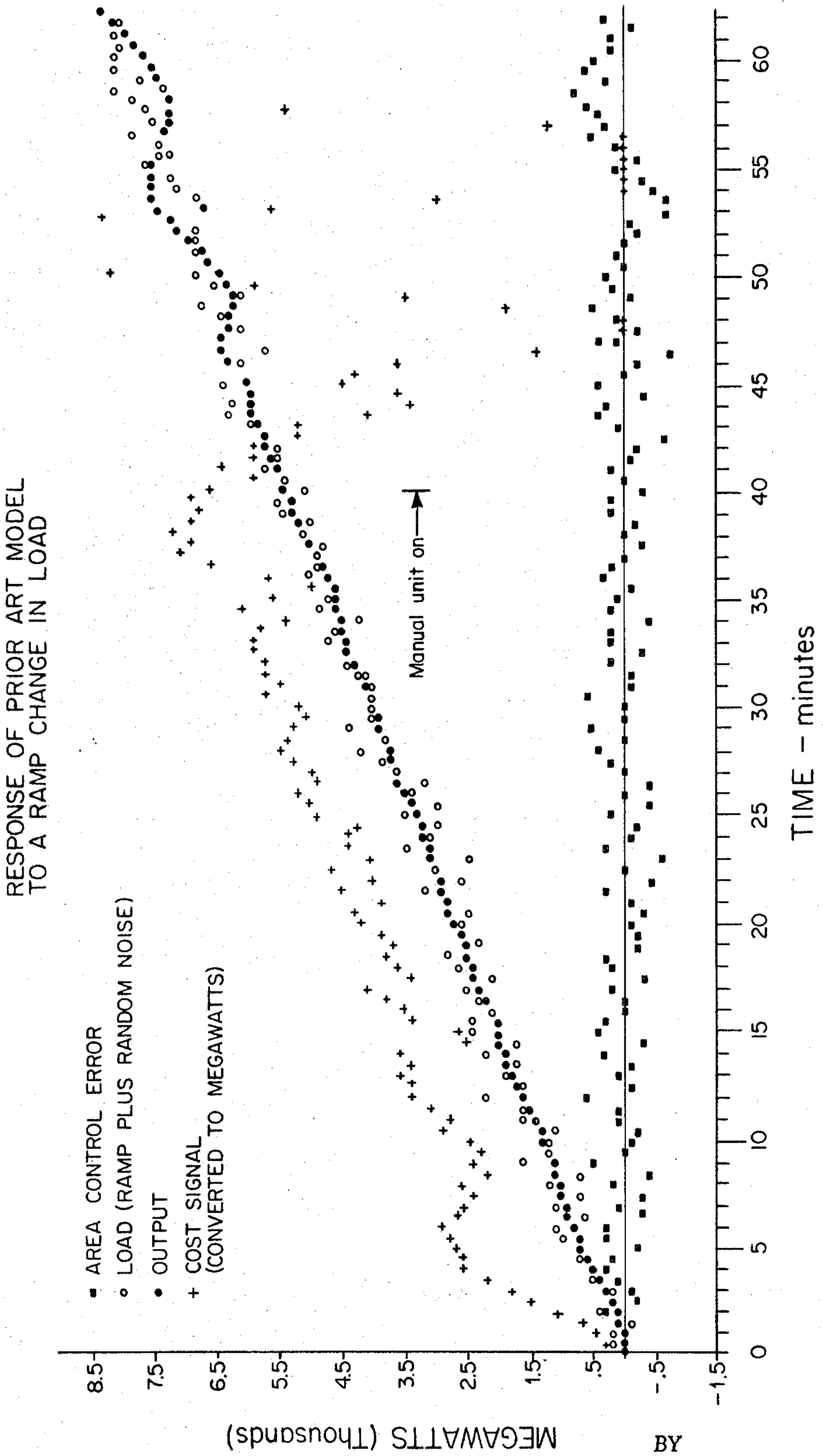
FIG. 3 shows the response of a conventional control system to a ramp increase in load.

A brief study of the behavior of a mathematical model of the system shown in FIG. 1, performed on a H800 general-purpose computer, is shown in FIG. 3 illustrating the response of such a system to a load which is increasing at a rate which is 10.6% of the total rate of the response of the automatically controlled units. To simulate the fact that in practice changes in load will not be smoothly increasing or decreasing, but will have random fluctuations, a random noise generator output was added to the ramp signal representing system load. Several deficiencies, familiar in the art, are evident in the characteristics of the response, and especially in the behavior of the cost signal. The cost signal exhibits a cyclic variation beyond that due to the random fluctuations in the load. When a manually controlled unit was brought on the line 40 minutes after the beginning of the run, the cost signal was driven sharply downward. At other times the cost signal was well in excess of its true value.

The deviations in the behavior of the prior art model from the desired performance, as shown in FIG. 3, illustrate the factors discussed hereinabove. It is felt that the root of the difficulties is the attempt to derive a system load signal from the ACE signal alone. Since the ACE signal carries the units of megawatts, it cannot be treated as the derivative of the total system load, and accordingly, a true representation of system load cannot be obtained by integrating the ACE signal. Further, because there is no clear distinction between or separation of the control and economic dispatch functions, control of the economic units is strongly coupled with control of the regulating units. Since such a prior art system fails to recognize that control of the economic units should be one of static optimization, deficiencies in the response of the regulating units are compensated for by uneconomic response from the economic, or non-regulating units, where static optimization is defined as the minimizing of the costs incurred in steady state operation. It is pertinent that the criterion for economic dispatch which is universally used in practice, is derived from considerations of static optimization. The uneconomic response of the economic units is in practice aggravated further by the omission of properly designated filtering to eliminate undesirable frequencies from the ACE signal.

Figure 2:
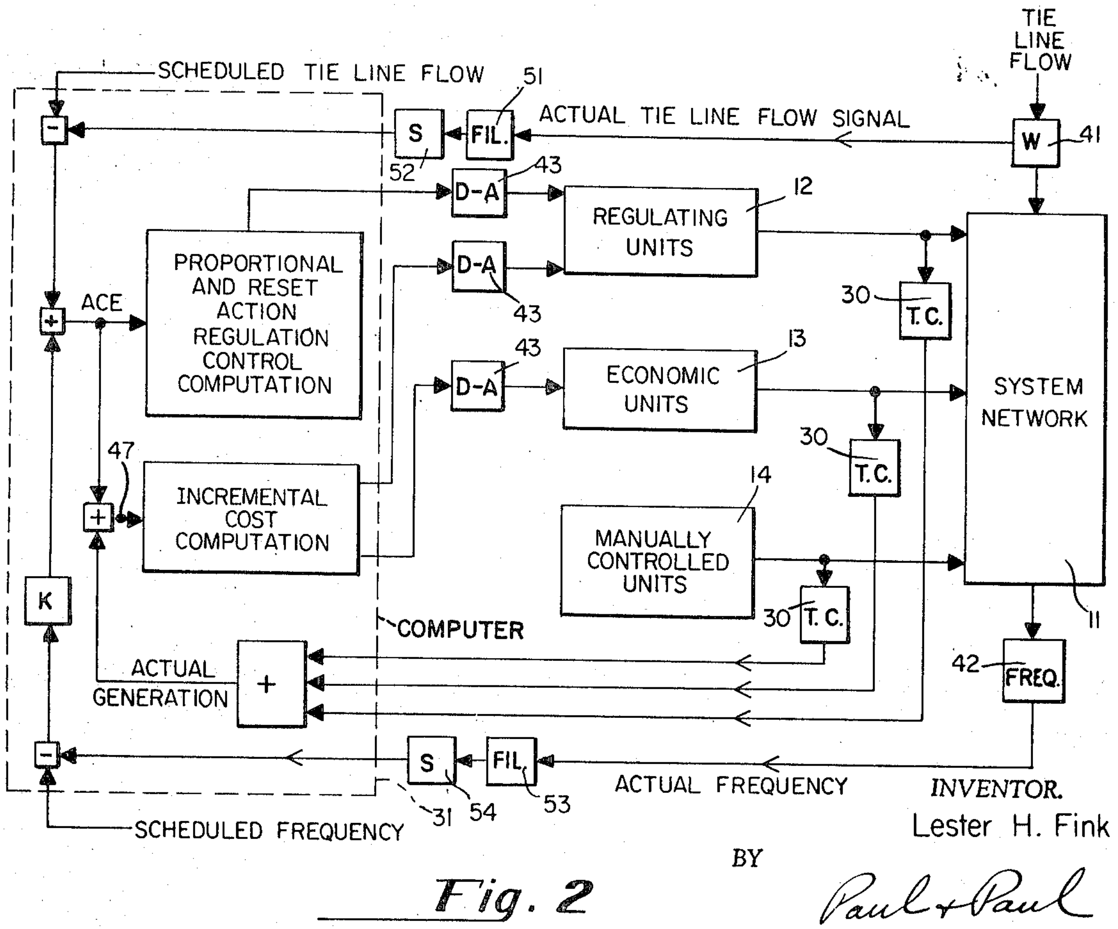
FIG. 2 is a block diagram of the system of this invention.

Referring now to FIG. 2, there is shown my improved control for interconnected power systems in which interdependence between the economic dispatch and regulating functions is eliminated. The control system of this invention is based on recognition of the fact that the ACE signal represents the difference between total system load and total system generation, and that a true measure of total system load can be obtained by adding the ACE signal to a summation of telemetered actual generation signals from generating stations. Accordingly, in this invention the economic dispatch signal is generated from a summation of total generation and ACE signals, rather than from an integration of the ACE signal as in the prior art. Generating units 12, 13 and 14 comprise the total actual generation of the controlled system. At each generation site, the generating units will be monitored by a thermal converter 30 of any suitable type, or any device capable of producing a signal proportional to generated power. The monitored signals will be added, sampled and telemetered to a central computer 31. The computer will sum the telemetered signals and thereby obtain the actual generation for the system. It is to be noted that the telemetered signals will represent periodic sampling of the actual system generation, which condition necessitates filtering, as discussed hereinbelow.

In the system of this invention, the ACE signal is computed by computer 31 using digital inputs representing actual tie-line flow and actual frequency, and information stored in memory representing scheduled tie-line flow and scheduled frequency. Actual tie-line flow is measured by conventional wattmeters 41, from which an analog signal is developed, sampled by a conventional sampler 52, and then telemetered to computer 31. Frequency is measured by a conventional frequency meter 42, preferably located at the computer, which develops an analog signal which is sampled by sampler 54, to provide digital information for the computer.

Prior to sampling of the tie-line flow and system frequency signals, they are filtered by conventional filter units 51 and 53 respectively such that any information which should not be part of the regulation control signal is eliminated. Specifically, all frequencies derived from the tie-line flow and system frequency signals that are above one-half the sampling frequency are eliminated. For example, with a two second sampling cycle, the control signal is filtered so as to reject all components having a frequency greater than 0.25 Hz. Similarly, the total load signal, derived from the total generation data and the ACE signal, is digitally filtered and sampled at point 47 prior to making the cost calculation. Such digital filtering will eliminate from the economic dispatch function frequencies higher than those which can be followed economically. For example, with a 12 second economic dispatch cycle, such that the cost computation is made every 12 seconds, the minimum requirement is that all frequencies above 0.042 Hz. be eliminated.

Upon calculation of the proportional and reset action regulation control signal, it is transmitted in digital from to respective regulating units of the system, where it is converted by a digital to analog converter 43 of any suitable commercial type into an analog signal for controlling the regulating units. Similarly, the calculated cost signal is converted to a generation control signal and transmitted in digital form to the respective economic units, where it is converted into an analog control signal. It is to be noted, as shown in FIG. 2, that the control signal for the economic units may be sent to any of the regulating units which are used also to carry part of the economic load.

As in the prior art, the computer calculation of the overall economic incremental cost signal, for allocation of fixed loading, converts the system load signal into a cost signal which is used to determine the economic proportioning of the load among the member companies or among respective generating units. Such computation must take into account the relationship between system generation and system incremental cost, matching the incremental cost of the operation of all system generating units. The characteristics, and particularly the incremental cost of generation of all individual units, must be known to the computer. This information will be programmed into the computer and available for the periodic cost computation. For an analysis of the controlled power interchange between electric systems, and computation of a system incremental cost signal, see U.S. Pat. No. 3,229,110, issued to W. S. Kleinbach et al. on Jan. 11, 1966.

A further improvement of this invention over the prior art comprises adding reset action to the proportional control of the regulating units. Reset action consists in integrating the ACE signal to derive a control signal which acts to drive the system such that the net or cumulative ACE signal is zero with time, while the proportional control component drives the system to keep the ACE signal within a specified limit. It is to be noted, however, that a multi-mode control may be used by deriving signals having components representing derivatives of the ACE signal, as well as integrals of tie-line and frequency deviation. The important feature of this invention, however, is deriving the economic signal independently of the regulating signal.

Figure 4:
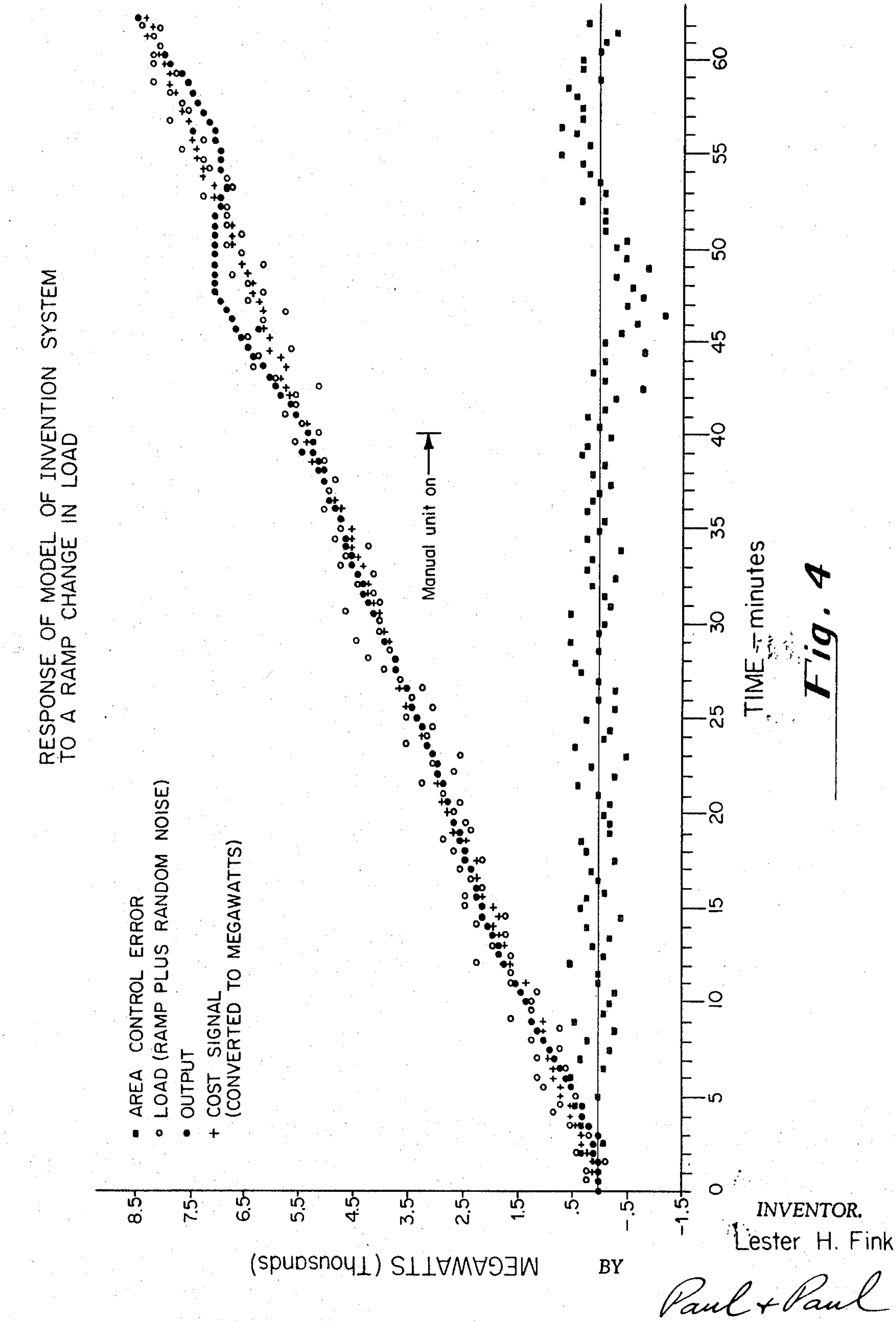
FIG. 4 shows the response of the system of this invention to a ramp increase in load.
Figure 5:
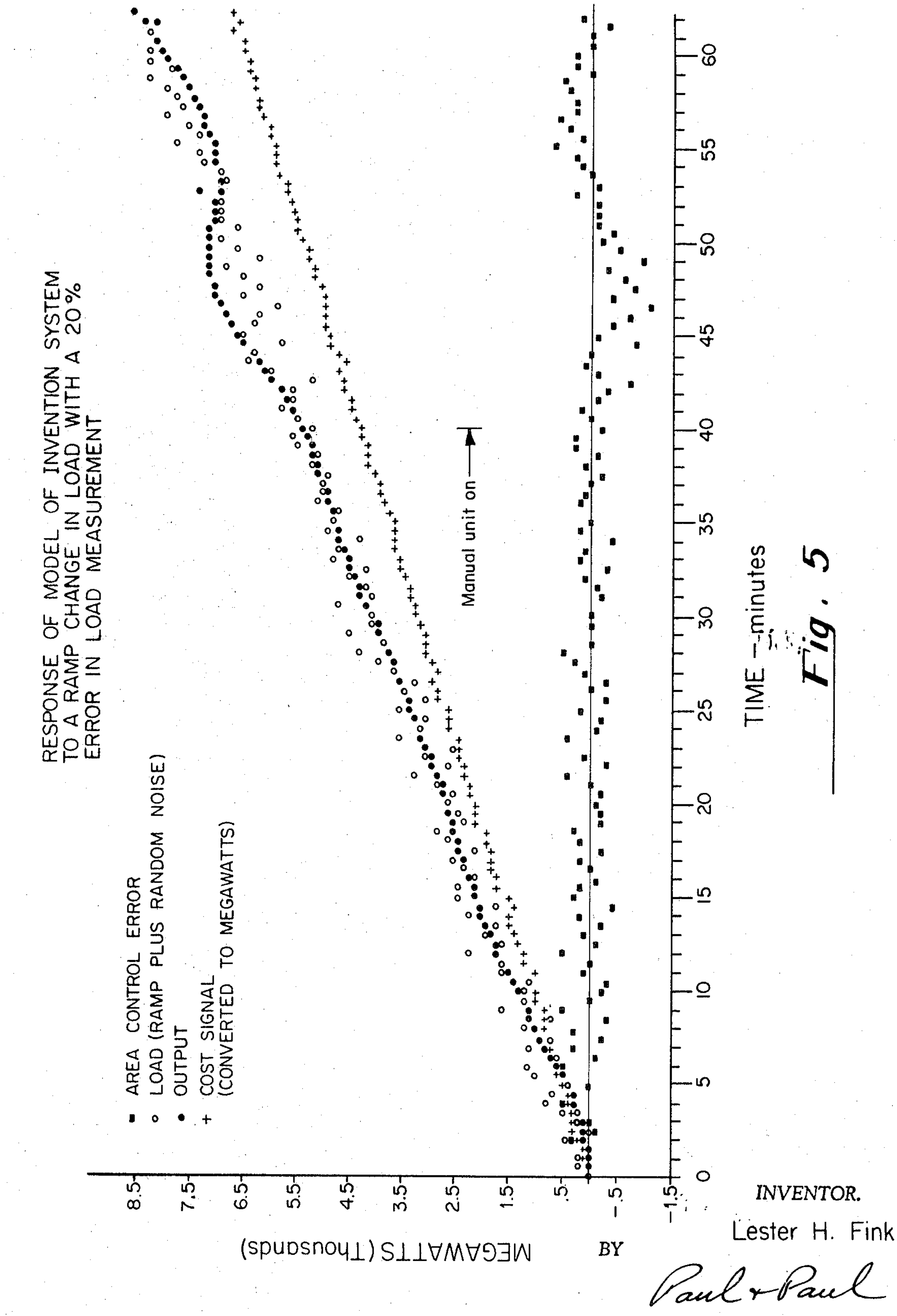
FIG. 5 shows the response of the system of this invention to a ramp increase in load, with a 20% error in the measure of the system load.

The system of this invention was also simulated on the H800 computer, with the results shown in FIG. 4, employing the same ramp load signal plus random noise, previously used to obtain the results shown in FIG. 3. The input used for making the incremental cost computation was digitally filtered to reject all frequencies beyond 0.1 Hz. The difference in response of the system of this invention as compared to the prior system when subjected to the same input is evident from a comparison of FIGS. 3 and 4. It should especially be noted how well the cost signal represents the smoothed value of the loads, being undisturbed even by the loading of a manually controlled unit beginning 40 minutes after the beginning of the run. Furthermore, in order to demonstrate the relative insensitivity of the system of this invention to poor accuracy in the measurement of the load, the simulation was repeated with a 20% error in the load signal used for the incremental cost calculation. This result is shown in FIG. 5, from which it is clear that it is unnecessary to measure system load with high accuracy in order to enable the system of this invention to provide substantially better control than the prior art system.

Figure 6A:
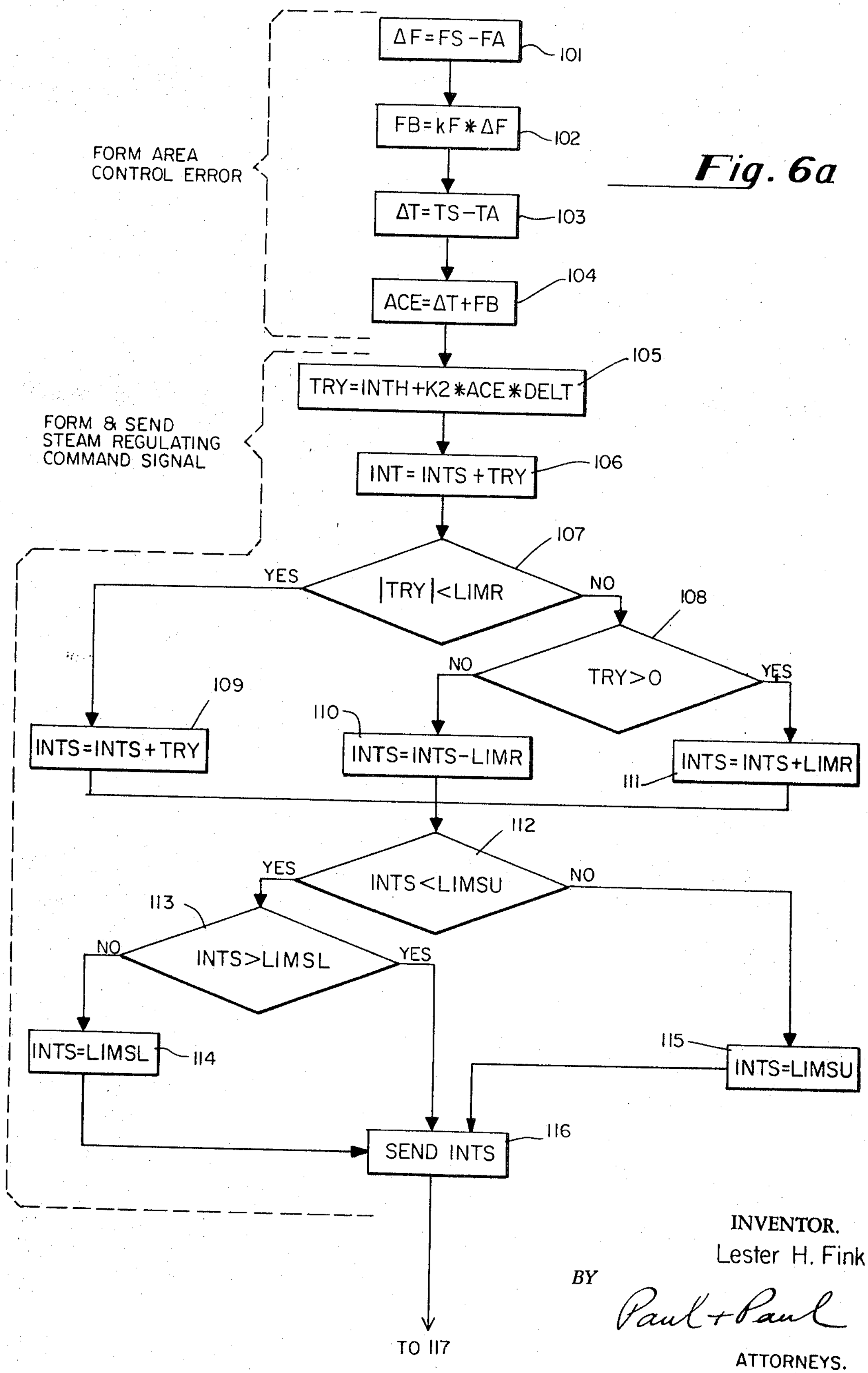
FIGS. 6*a* and 6*b* together comprise a schematic block diagram of outline fragments of a form of computer program flow chart for carrying out mathematical operations in a general purpose digital computer in accordance with this invention.
Figure 6B:
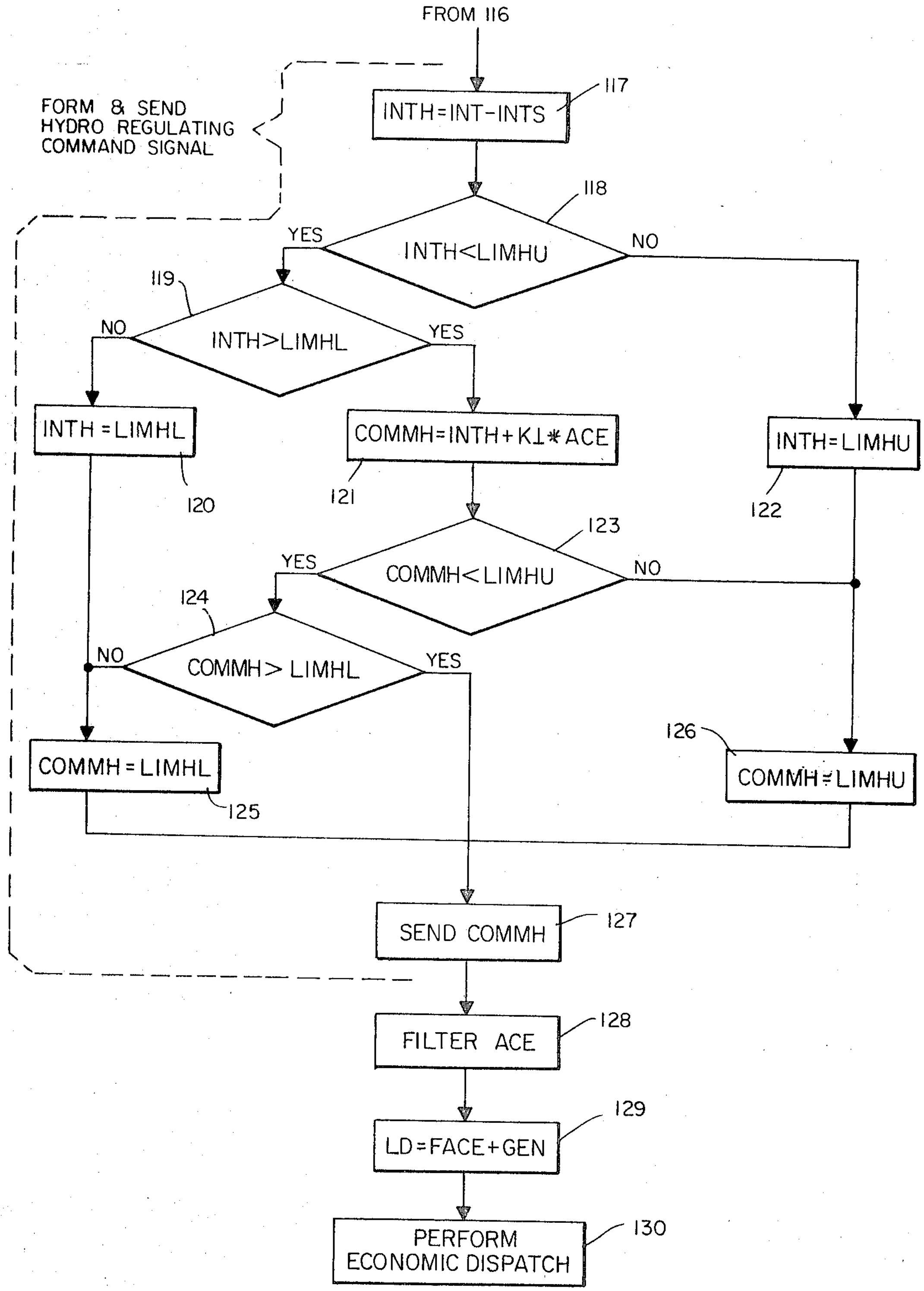

FIGS. 6*a* and 6*b*, taken together, comprise a flow chart representation of a computer program for carrying out the calculations indicated heretofore in the specification. Blocks 1 through 4 indicate the steps for calculation of the area control error signal. Blocks 105 through 127 indicate steps for calculation of the regulation command signal, which signal is used to control the regulating units. The calculation of the regulation command signal is affected by the type of generating units that are assigned to this duty. The algorithm embodied in the illustrated flow chart assumes that both steam and hydro units are available for this duty. It is understood that gas turbines and other types of generating units may be assigned to regulating duties, and they may be treated in this illustration as hydro units. It is further understood that alternative algorithms for regulation only by steam units, or by only any other given type of unit, may be used.

Block 128 of FIG. 6 indicates computer filtering of the area control error signal. This digital filtering may be accomplished by any suitable digital filter program having a flat-response low-frequency pass band and a sharp cut off with severe attenuation of higher frequencies. A suitable digital filter having such characteristics is described in an article titled "Digital Filtering in Electrocardiogram Processing" by Weaver et al., which was published in the IEEE Transactions on Audio and Electro Acoustics, September 1968, page 354, FIG. 4.

Block 130 of FIG. 6*b* indicates calculation of the economic dispatch signal, for controlling the economic units. The economic dispatch signal may be calculated by using any suitable economic dispatch program, using the combination of the ACE signal and total generation signal as an input. Such a program is described in the textbook "Electric Energy Systems Theory: An Introduction," by O. I. Elgerd, McGraw-Hill Book Co., New York, N.Y., 1971, on pages 299–304. See, specifically, the flow diagram illustrated in FIGS. 8–10 of the Elgerd publication.

The following Glossary defines symbols which are used in the flow diagram of FIGS. 6*a* and 6*b*.

GLOSSARY

101—
- ΔF: Frequency deviation
- FS: Scheduled frequency (A)
- FA: Actual frequency (B)

102—
- FB: Frequency bias (A)
- KF: Frequency bias constant (A)

103—
- ΔT: Tie line error
- TS: Scheduled net tie flow (A)
- TA: Actual net tie flow (B)

104—
- ACE: Area control error

105—
- TRY: I.P. (internal parameter defined by its usage inside algorithm)
- INTH: Hydro share of reset portion of R.C.S. (regulating command signal)
- K2: Hydro regulation reset coefficient (C)
- DELT: Time interval between repetitions of load frequency control algorithm (D)

106—
- INT: Reset portion of total (steam and hydro) R.C.S.
- INTS: Steam share of reset portion of R.C.S.
- LIMR: Maximum allowable rate of response of steam regulating capacity (A)

112—
- LIMSU: Upper limit of available steam regulating capacity (A)

113—
- LIMSL: Lower limit of available steam regulating capacity (A)

118—
- LIMHU: Upper limit of available hydro regulating capacity (A)

119—
- LIMHL: Lower limit of available hydro regulating capacity (A)

121—
- COMMH: Hydro share of R.C.S.

- KI: Hydro regulation proportional coefficient (C)

129—
- FACE: Filtered representation of area control error
- LD: Total system load
- GEN: Total system generation (B)

NOTES (A) Constants set manually by system operator
(B) Telemetered values
(C) Constants set by programmer
(D) Read from computer internal clock Referring now to the details of the flow diagram, the frequency deviation is first computed (101) by subtracting actual frequency from scheduled frequency. The frequency bias (FB) is obtained (102) by multiplying the frequency deviation by a frequency bias constant, *k*F. At 103, tie line error is computed by subtracting actual net tie flow from scheduled net tie flow, and the ACE signal is computed (104) by adding tie line error and frequency bias.

In forming the steam regulating command signal, the internal parameter TRY is calculated as set forth in block 105. INTH is available in the computer from the previous run, having been generated at step 117, 120 or 122 (see FIG. 6*b*). Coefficient K2 is multiplied by the calculated ACE signal and in turn by the DELT signal, read from the computer internal clock, such product being added to INTH. In step 106, INT (representing the integral signal) is formed by adding the INTS signal (derived in the previous run, from 109, 110, 111, 114 or 115) to the calculated TRY signal. Next, in block 107, TRY is compared with the rate limit LIMR. If the magnitude of TRY is less than LIMR, a new value of INTS is formed by adding the prior value to the calculated TRY value (109). If the magnitude of TRY is not less than LIMR, TRY is examined (108) to determine whether it is greater than zero. If it is greater than zero, the new value of INTS is calculated by adding LIMR to the prior value (111). If TRY is not greater than zero, a new value of INTS is calculated (110) by subtracting LIMR from the prior value of INTS.

The value of INTS thus formed in step 109, 110 or 111, is compared (112) with the upper limit of available steam regulating capacity, LIMSU. If INTS is less than LIMSU, a further comparison is made (113) to determine whether it is greater than LIMSL. If it is greater, it is adopted as the final value of INTS and, in step 116, sent to the team regulating units. If it is not greater than LIMSL, it is (114) set equal to LIMSL, such that it equals the lower limit of available steam regulating capacity, and is sent to the regulating units. Referring back to step 112, if INTS is not less than LIMSU, it is (115) set equal to LIMSU, such that the upper limit of available steam regulating capacity is sent to the regulating units.

Referring to FIG. 6*b*, there are shown the steps for forming and sending the hydro portion of the regulating command signal. At step 117, the INTH signal is derived by subtracting the INTS signal from the INT signal. At step 118, INTH is tested to determine whether it is less than LIMHU. If it is less, further comparison is made (119) to see whether it is greater than LIMHL. If so, the hydro share of the regulating command signal, COMMH, is calculated by adding to INTH the product of K1 x ACE (121). COMMH is then compared with LIMHU (123), and if less than LIMHU, is compared with LIMHL (124). If it is greater than LIMHL, it is adopted and sent to the hydro regulating units. If it is not greater than LIMHL, it is set equal to LIMHL (125), and such lower limit is adopted as the hydro regulating signal.

Returning to block 119, if INTH is not greater than LIMHL, it is set equal to LIMHL (block 120), and utilized as the hydro regulating signal.

Referring again to block 118, if INTH is not less than LIMHU, it is set equal to LIMHU (122), and the hydro command signal is set equal to LIMHU (126) and sent to the hydro regulating units.

Returning to block 123, if COMMH as calculated at block 121 is not less than LIMHU, it is set equal to LIMHU (126), and sent to the hydro regulating units.

It is to be noted from the above analysis of the flow diagram for forming the steam regulating command signal that a reset (or integral) steam signal alone is computed, without a proportional component. Thus, INTS is an integral signal for steam, and the INTS signal sent to the regulating units represents the steam share of the reset portion of the total regulating command signal (R.C.S.). For the hydroregulating signal. COMMH (hydro share of R.C.S.) is formed by adding to the hydro reset signal INTH a proportional signal, as indicated at block 121. Thus, the hydro command signal contains both reset and proportional components. It is readily apparent, however, that in like manner any combination of the four possibilities could be programmed, such that both the steam and hydro regulating signals might comprise reset and/or proportional components. Also, as is spelled out in detail above, the signals thus computed are tested against upper and lower limits, to provide limit control over the regulating operation.

I claim:

1. A method of computer control of regulating and economic dispatch power generation units in a power network, with separation of the regulating and economic dispatch control functions, said method utilizing a general purpose digital computer having a stored program, comprising:

(a) generating by said programmed computer a total generation signal corresponding to the actual total generation of said regulating and economic dispatch generation units;

(b) generating by said programmed computer an area control error signal corresponding to the difference between total network load and total network generation;

(c) generating by said programmed computer an overall cost control signal as a function of said total generation signal and said area control error signal;

(d) controlling said economic dispatch generation units in accordance with said overall cost control signal;

(e) generating by said programmed computer a regulating control signal as a function of said area control signal; and (f) controlling said regulating generation units in accordance with said regulating control signal.

2. The method as described in claim 1 comprising controlling at least some of said regulating generation units in accordance with both said overall cost control signal and said regulating control signal.

3. The method as described in claim 1 comprising:

(a) continuously monitoring said regulating and economic dispatch generation units to obtain analog generation signals representing the power generation of said units;

(b) periodically sampling said analog generation signals to obtain digital generation signals;

(c) transmitting said digital generation signals to said computer; and (d) storing said digital generation signals in said computer under the control of said program, prior to generating said total generation signal.

4. The method as described in claim 3, comprising:

(a) continuously monitoring network frequency and tie-line flow across the boundaries of said network to obtain analog frequency and tie-line flow signals;

(b) periodically sampling said analog frequency and tie-line flow signals to obtain digital frequency and tie-line flow signals;

(c) transmitting said digital frequency and tie-line flow signals to said computer; and (d) storing said digital frequency and tie-line flow signals in said computer under the control of said program prior to generating said area control error signal.

5. The method as described in claim 4 wherein said frequency and tie-line flow analog signal is filtered before said periodic sampling, to eliminate all frequencies above at most one-half of the frequency of said sampling.

6. The method as described in claim 5 comprising the step of adding in said progammed computer said filtered digital frequency and tie-line flow signals to produce said area control error signal.

7. The method as described in claim 6 comprising the steps, performed in said programmed computer, of combining said area control error signal with said digital total generation signal to produce a total network load signal, digitally filtering and sampling said total network load signal to produce a filtered total network load signal, said digital filtering being such as to reject all frequency components above at most one-half of the sampling frequency of said filtered total network load signal, and generating said overall cost control signal from said filtered total network load signal.

8. The method as described in claim 3 comprising generating periodically in said programmed computer said total generation signal, said area control error signal, said overall cost control signal and said regulating control signal, and carrying on continuously the steps of controlling said economic dispatch generation units and said regulating generation units.

9. The method as described in claim 1 wherein the step of generating said regulating control signal is performed substantially as set forth in FIGS. *6a* and *6b* herein.

10. A method of computer control of economic dispatch generation units in a power network, said method utilizing a general purpose digital computer having a stored program, comprising:

(a) storing in a computer, under the control of said program, signals representing scheduled frequency and scheduled tie-line flow across the boundaries of said power network;

(b) periodically sampling total actual generation in said power network and generating therefrom in said programmed computer signals representing total actual generation, and storing said generation signals in said computer;

(c) periodically sampling actual frequency of said power network and generating therefrom in said programmed computer signals representing said actual frequency, and storing said actual frequency signals in said computer, (d) periodically sampling actual tie-line flow across the boundaries of said power network and generating therefrom in said programmed computer signals representing actual tie-line flow, and storing said actual tie-line flow signals in said computer;

(e) periodically computing in said programmed computer an area control error signal as a function of said scheduled tie-line flow and frequency signals, and said actual tie-line flow and frequency signals;

(f) periodically adding in said programmed computer said area control error signal to said actual total generation signal to obtain a summation signal;

(g) periodically computing in said programmed computer an economic dispatch signal from said summation signal;

(h) transmitting said periodically computer economic dispatch signal to said economic generation units; and (i) continuously controlling said economic units with said economic dispatch signal, to provide economic fixed system loading.

11. The method as described in claim 10 comprising:
(a) periodically computing in said programmed computer a regulating signal as a function of said computed area control error signal;
(b) transmitting said regulating signal to said regulating units;
(c) continuously regulating said regulating units in accordance with said transmitted regulating signal; and
(d) whereby separation of the dispatch and regulating control functions is achieved, with the economic dispatch signals being determined on the basis of system load, and the regulating signals being determined on the basis of the area control error signal.

12. The method as described in claim 11 wherein said periodic computing of said regulating signal comprises generating a proportional signal from said area control error signal, integrating said area control error signal, and computing a proportional and reset regulating signal from said proportional and integrated signals.

13. The method as described in claim 10 wherein:
said periodic sampling of actual frequency of said power network comprises measuring network frequency, developing an analog signal representing network frequency, sampling said analog frequency signal to provide said actual frequency signal in digital form, and telemetering said digital frequency signal to said computer; and said periodic sampling of actual tie-line flow in said power network comprises measuring said actual tie-line flow, developing an analog signal representing said actual tie-line flow, sampling said analog signal to provide said actual tie-line flow signal in digital form, and telemetering said digital tie-line flow signal to said computer.

14. The method as described in claim 10 wherein said periodic sampling of total actual generation in said power network comprises monitoring said generation units to develop analog signals proportional to the generated power of each unit, sampling said analog signals to obtain digital signals, and telemetering said digital signals to said computer.

15. The method as described in claim 10 comprising filtering said actual frequency and actual tie-line flow signals prior to sampling, and digitally filtering and sampling said summation signal prior to computing said economic dispatch signal.

16. The method as described in claim 10 comprising transmitting the economic dispatch signal to at least one of said regulating units, and continuously controlling said at least one unit for carrying part of the economic load of said power network.

17. The method as described in claim 10 wherein the step of computing said economic dispatch signal includes matching the incremental cost of the operation of all system economic dispatch generation units.

18. The method as described in claim 10 comprising periodically computing in said programmed computer a regulating signal in accordance with the step as set forth in FIGS. 6*a* and 6*b*.

19. In a computer controlled power network, having regulating and economic generation units, with separate control of said regulating and economic units, apparatus comprising computing means for performing the following functions:
(a) summing generation signals of said regulating and economic dispatch generation units to obtain a total actual generation signal;
(b) calculating and area control error signal;
(c) adding said area control error signal and said total actual generation signal;
(d) calculating an incremental cost signal from said added area control error and total actual generation signals, for use in control of said economic generation units; and (e) calculating from said area control error signal, and independently of said incremental cost computation, a control signal to regulate said regulating units, said computing means comprising a general purpose digital computer having a stored program.

20. The apparatus as described in claim 19 wherein said computer means performs the function of calculating a control signal to regulate said regulating units substantially as set forth in FIGS. 6*a* and 6*b* herein.

21. In computer control of regulation and economic dispatch generation units of a power network, with separation of the regulating and dispatch function, a computer calculated control method utilizing a general purpose digital computer having a stored program, comprising the following steps performed by said computer:
(a) summing generation signals representing actual generation of said regulating and economic dispatch generation units to obtain a total actual generation signal;
(b) computing an area control error signal representing the difference between network load and network generation;
(c) combining said area control error signal and said total actual generation signal to obtain a combined signal;
(d) computing from said combined signal an incremental cost signal for control of said economic dispatch generation units; and
(e) computing from said area control error signal a proportional and reset control signal to regulate said regulating generation units.

22. In computer control of regulation and economic dispatch generation units of a power network, with separation of the regulating and dispatch functions, a control method utilizing a general purpose digital computer having a stored program, comprising:
(a) continuously monitoring actual generation of said power network to obtain actual generation signals;
(b) telemetering said monitored actual generation signals to said computer;
(c) computing in said computer a total generation signal from said monitored actual generation signals;
(d) computing in said computer an area control error signal;
(e) adding in said computer said area control error signal to said total generation signal to obtain a total system load signal;
(f) computing in said computer an economic incremental cost signal derived from said total system load signal for allocation of fixed loading;
(g) transmitting said computed incremental cost signal to said economic dispatch units of said network;
(h) controlling said economic dispatch units with said incremental cost signal;
(i) computing in said computer a regulating signal for regulation of said regulating units;
(j) transmitting said computed regulating signal to said regulating generation units; and
(k) controlling said regulating units with said regulating signal.

23. A method of computer control of regulating and economic dispatch power generation units in a power network, with separation of the regulating and economic dispatch control functions, said method utilizing a general purpose digital computer having a stored program, comprising:
(a) generating by said programmed computer a total generation signal corresponding to the actual total generation of said regulating and economic dispatch generation units;
(b) generating by said programmed computer an area control error signal corresponding to the difference between total network load and total network generation;

(c) generating, by said programmed computer, an overall cost control signal derived from the sum of said area control error signal and said total generation signal; and (d) controlling said economic dispatch generation units in accordance with said overall cost control signal.

24. In a computer controlled power network, having regulating and economic generation units, with separate control of said regulating and economic units, control apparatus comprising:

(a) computer means, having a general purpose digital computer with a stored program, for performing the following functions:

(i) summing generation signals of said regulation and economic dispatch generation units to obtain a total actual generation signal;

(ii) calculating an area control error signal;

(iii) adding said area control error signal and said total actual generation signal;

(iv) calculating an incremental cost signal from said added area control error and total actual generation signals, for use in control of said economic generation units; and (v) calculating from said area control error signal, and independently of said incremental cost computation, a control signal to regulate said regulating units, said computing means comprising a general purpose digital computer having a stored program;

(b) economic control means in communication with said computer means, for controlling said economic generation units as a function of said incremental cost signal; and (c) regulating control means in communication with said computer means, for controlling said regulating units as a function of said proportional and reset control signal.

References Cited

UNITED STATES PATENTS

| | | | |
|---|---|---|---|
| 3,392,272 | 7/1968 | Stadlin | 235—151.21 |
| 3,405,279 | 10/1968 | Ross | 307—29 |
| 3,270,209 | 8/1966 | Cohn | 235—151.21 |
| 3,229,110 | 1/1966 | Kleinbach et al. | 235—151.21 |
| 3,510,637 | 5/1970 | Ross | 235—151.21 |

MALCOLM A. MORRISON, Primary Examiner

E. J. WISE, Assistant Examiner

U.S. Cl. X.R.

235—151.31; 444—1; 307—57